(12) United States Patent
Nitahara

(10) Patent No.: US 6,604,108 B1
(45) Date of Patent: Aug. 5, 2003

(54) INFORMATION MART SYSTEM AND INFORMATION MART BROWSER

(75) Inventor: Kim Nitahara, Bridgewater, NJ (US)

(73) Assignee: Metasolutions, Inc., Warren, NJ (US)

( * ) Notice: Subject to any disclaimer, the term of this patent is extended or adjusted under 35 U.S.C. 154(b) by 0 days.

(21) Appl. No.: 09/325,428

(22) Filed: Jun. 4, 1999

Related U.S. Application Data

(60) Provisional application No. 60/088,245, filed on Jun. 5, 1998.

(51) Int. Cl.⁷ .............. G06F 7/00; G12Q 1/64
(52) U.S. Cl. .............. 707/102; 707/104.1; 435/9
(58) Field of Search ............... 707/1–5, 10, 100–104, 707/501–513; 709/300; 382/103, 173; 345/700, 961; 705/2, 3; 435/7, 9

(56) References Cited

U.S. PATENT DOCUMENTS

| | | | | |
|---|---|---|---|---|
| 5,987,454 A | * | 11/1999 | Hobbs | 707/4 |
| 6,078,924 A | * | 6/2000 | Ainsbury et al. | 707/101 |
| 6,279,007 B1 | * | 8/2001 | Uppala | 707/101 |

\* cited by examiner

*Primary Examiner*—Safet Metjahic
*Assistant Examiner*—Te Y Chen
(74) *Attorney, Agent, or Firm*—Foley & Lardner

(57) ABSTRACT

The invention pertains to an information mart system and information mart browser. The information mart provides an automated mechanism for gathering data that is dispersed among the electronic data storage facilities of an enterprise, and for synthesizing and structuring the gathered data in accordance with the needs of user who require information to analyze the operation of the enterprise. The information mart generates content files that are organized in accordance with a predefined hierarchy of subjects, and a predefined set of relational attributes that are applied to all subjects of the subject hierarchy. The user is thereby provided with both hierarchical and relational access to the data. The user is enabled to browse the data in an intuitive manner through browser navigation tools provided in a graphical user interface that allow the user to provide input specifying a subject of interest and a relational attribute that characterizes the information desired about the subject. The browser further provides multiple simultaneous displays of content files containing related information. Multiple display of files provides juxtaposition of information that is derived from multiple sources and conveyed in multiple formats, thereby enhancing the user's capacity for synthesizing and deriving further knowledge. The information mart system thus enables users to locate and browse the vast amount of disparate information that is used by an enterprise using an intuitive navigational metaphor that utilizes both a hierarchical and relational model.

19 Claims, 14 Drawing Sheets

INFORMATION MART SYSTEM AND INFORMATION MART BROWSER

RELATED APPLICATIONS

The present application claims priority from U.S. provisional application Ser. No. 60/088,245, filed Jun. 5 1998, the entirety of which, including all appendices, is incorporated herein by reference.

FIELD OF THE INVENTION

The invention pertains to the field of knowledge management.

BACKGROUND OF THE INVENTION

Data production is a function and by-product of the activities of most enterprises. However, while databases and data warehouses are effective for storage of data, their structures and capabilities generally reflect the needs of the enterprise's discrete data production processes, rather than the needs of high level users whose function is to analyze the operation of the enterprise. Although a great deal of information about the enterprise is contained in its data, a high level analyst may not know whether desired information is actually reflected in any record that is possessed by the enterprise. Further, the user may not know where among an enterprise's many electronic data storage facilities that information is likely to be found. The user is unlikely to know how to retrieve a desired record from a given database, since the specifications that are known to the user (i.e. the characteristics of the desired information) are unlikely to be the same as those used to identify a particular database record or data file that contains it. These problems are compounded when desired information is not reflected in an individual record, but instead can only be derived through synthesis of data contained in multiple records. In this case, the various records may be stored in different data storage facilities, and the manner of identifying and organizing records in each of the different data storage facilities is unlikely to be the same.

SUMMARY OF THE INVENTION

The invention addresses the above problems by providing an automated system, referred to as an "information mart," for gathering data that is dispersed among the electronic data storage facilities of an enterprise, and for synthesizing and structuring the gathered data in accordance with the needs of user who require information to analyze the operation of the enterprise. The information mart provides a mechanism to organize the data in accordance with a predefined hierarchy of subjects for analysis, and a predefined set of relational attributes that are applied to all subjects of the subject hierarchy. The user is thereby provided with both hierarchical and relational access to the data. The user is enabled to browse the data in an intuitive manner through browser navigation tools provided in a graphical user interface that allow the user to provide input specifying a subject of interest and a relational attribute that characterizes the information desired about the subject. The browser further provides multiple simultaneous displays of content files containing related information. Multiple display of files provides juxtaposition of information that is derived from multiple sources and conveyed in multiple formats, thereby enhancing the user's capacity for synthesizing and deriving further knowledge.

The information mart thus enables users to locate and browse the vast amount of disparate information that is used by an enterprise using an intuitive navigational metaphor that utilizes both a hierarchical and relational model. The information mart system described herein provides a mechanism to automate the production and simplify the navigation of pre-defined sets of related information that has been "harvested" from multiple, disparate electronic data sources that may be located both within and external to the enterprise.

Generic and preferred embodiments of systems and processes in accordance with the invention are described below, and the scope of the invention is defined in the appended claims. For purposes of summary, an information mart system in accordance with the invention generally has three aspects.

The first aspect of the information mart system is the logical design of the content file structure. The logical design is based upon a predefined hierarchy of subjects relating to an about which information may be desired. The logical design of the information mart further includes a predefined common set of "types of information", referred to herein as relational attributes, that are provided for each subject of the predefined hierarchy. Each subject within the subject hierarchy of the information mart is populated with displayable content files, and each content file is associated with one or more of the predefined relational attributes. Accordingly, every subject in the hierarchy effectively contains one or more groups of content files that are logically related because they each have the same relational attribute value. The logical design of the information mart can therefore be described as a group of content files that provide information pertaining to an enterprise, arranged hierarchically by subject, and arranged relationally by common relational attribute.

The second aspect of the information mart system is its physical implementation. The information mart content files are produced from data that resides in the various disparate electronic data storage facilities associated with the enterprise. A content file may be an existing file from the enterprise's data storage facilities (e.g. an html document, a data table, a graphic, etc.), or it may be the result of processing of source data from a single source file (e.g. a graphic generated from a database record, a portion of a document, etc.), or it may be the result of processing of source data from multiple source files (e.g. a graphic generated using multiple database records from different databases). The content file may be stored locally in the information mart system, as would generally be true for a processed file, or it may be stored remotely and accessed as necessary, as might be the case for a file stored on a remote web server. Population of the information mart therefore involves, for every content file, determining the related source data for creating the content file, processing the source data, if necessary, and associating the physical address of the locally or remotely stored content file with the identifier of the content file.

To ensure that content files of the information mart system are current, the system may periodically update all locally stored content files. This may be accomplished by reacquiring and reprocessing all source data from the various electronic data storage facilities and rewriting the entire information mart. Alternatively, updating may be accomplished by comparing the time date stamp of each locally stored content file with the time date stamp of the current version of each file containing the content file's source data, and selectively recreating out-of-date content files. As a further alternative, content files may be dynamically created (or updated) when requested for delivery to an end user, thus ensuring that the user receives current information.

Physical file organization may be accomplished through the use of a file folder tree structure that physically represents the hierarchy of subjects and the relational attributes corresponding to each subject. Alternatively, files may be virtually organized by means of a database that associates file identifiers with predefined subjects and predefined relational attributes.

The third aspect of the information mart system is browsing of content files by information users. A file server provides content files to a browser application for display to an end user in response to queries initiated by the end user through the browser. The queries are generated through selections by the user from among the predefined subject hierarchy and predefined relational attributes. The browser includes subject navigation tools for making these selections, including a subject navigation tool that allows the user to navigate through the subjects of the predefined subject hierarchy, and an attribute navigation tool that allows the user to navigate among the various predefined types of available information. The browser further includes multiple, simultaneously-displayed windows, each of which independently initiates queries to the file server in response to user manipulation of the navigation tools. Each window examines the record returned by the file server to determine its file type, and launches an appropriate application for displaying that file type in the window. Each window may further provide a pull-down list of alternate information mart files that correspond to the user specified subject and attribute but are not displayed, and the user may be allowed to initiate display of one of the listed alternate files.

The invention is considered to be embodied in an information mart system as disclosed herein, as well as in an information mart content creation facility, information mart server facility, and information mart browser facility as disclosed herein. The invention is further considered to be embodied in processes performed by the aforementioned facilities, as disclosed herein, and to be embodied in computer readable media storing control programming for configuring a data processing device to function as one of the aforementioned facilities disclosed herein, or to perform processes performed by the aforementioned facilities.

Further description of specific aspects of the invention and a preferred embodiment is provided below.

DETAILED DESCRIPTION OF THE INVENTION

The following description first addresses the generic characteristics of systems implemented in accordance with the invention. A preferred embodiment of the invention, involving an information mart for enabling analysis of data generated in the process of clinical testing of pharmaceutical products, is then described. It is implicit in all description that the systems and their various facilities and processes described herein are implemented on general purpose computers through appropriate control programming. Those of ordinary skill in the art will be capable of implementing the subject invention without undue experimentation based on the description provided herein.

Figure 1:
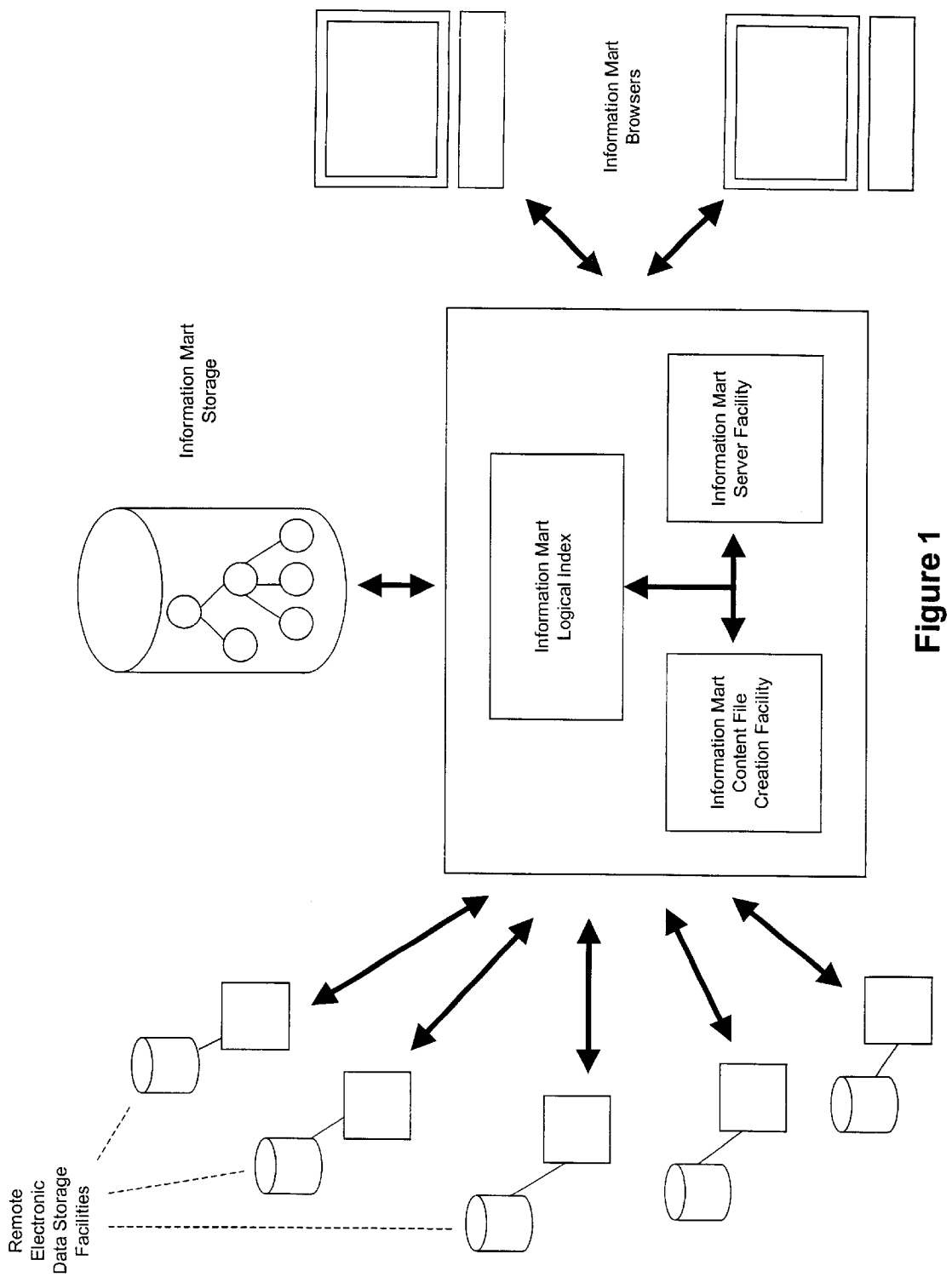
FIG. 1 shows basic features of a generic information mart system.

FIG. 1 shows the basic features of a generic information mart system in accordance with the invention. In the system, a content creation facility and a server facility share access to an information mart storage device and a logical index. The logical index identifies each content file made available by the system using a unique content file identifier, and associates each content identifier with a subject from a predefined subject hierarchy, one or more relational attributes from a predefined set of relational attributes, identifiers of source data for generating the content file, an identifier of processing rules for processing the source data to yield the content file, and a physical address of the content file.

The information mart content creation facility is enabled to retrieve data from remote electronic data storage facilities (i.e. data storage facilities that are not part of the information mart system) that are associated with the enterprise that is served by the information mart. Any type of data storage facility may potentially be accessed by the information mart system. Presently envisioned data storage facilities include web servers, data warehouses and databases. The content file creation facility may retrieve entire files, or, in the case of databases, may simply retrieve individual records or record elements, for example, through the use of industry standard data base connectivity tools. Files or data retrieved by the content file creation facility may be processed to alter or enhance its form, and ultimately yield the content files that populate the information mart. The content files may be stored in local information mart storage or may reside in the remote data storage facility, in accordance with the nature of the specific file. The content creation facility may further act to periodically update the information mart. Updating may be scheduled to avoid conflicts with other system usage requirements (for example, by updating overnight), or may be done with high frequency where the information reflected in the information mart files is of a highly time sensitive nature. Updating may be performed through wholesale recreation of all content files, or by selective identification and recreation of out-of-date content files. Alternatively, files may be individually created when specifically requested by the server facility for display to an end user.

The information mart system further includes the information mart server facility, which provides content files to information mart browser facilities in accordance with queries produced through user manipulation of navigation tools. Links to files are determined by the server through reference to the logical index. Files are retrieved from local storage or remote servers, as appropriate, and returned to browsers for display.

Figure 2:
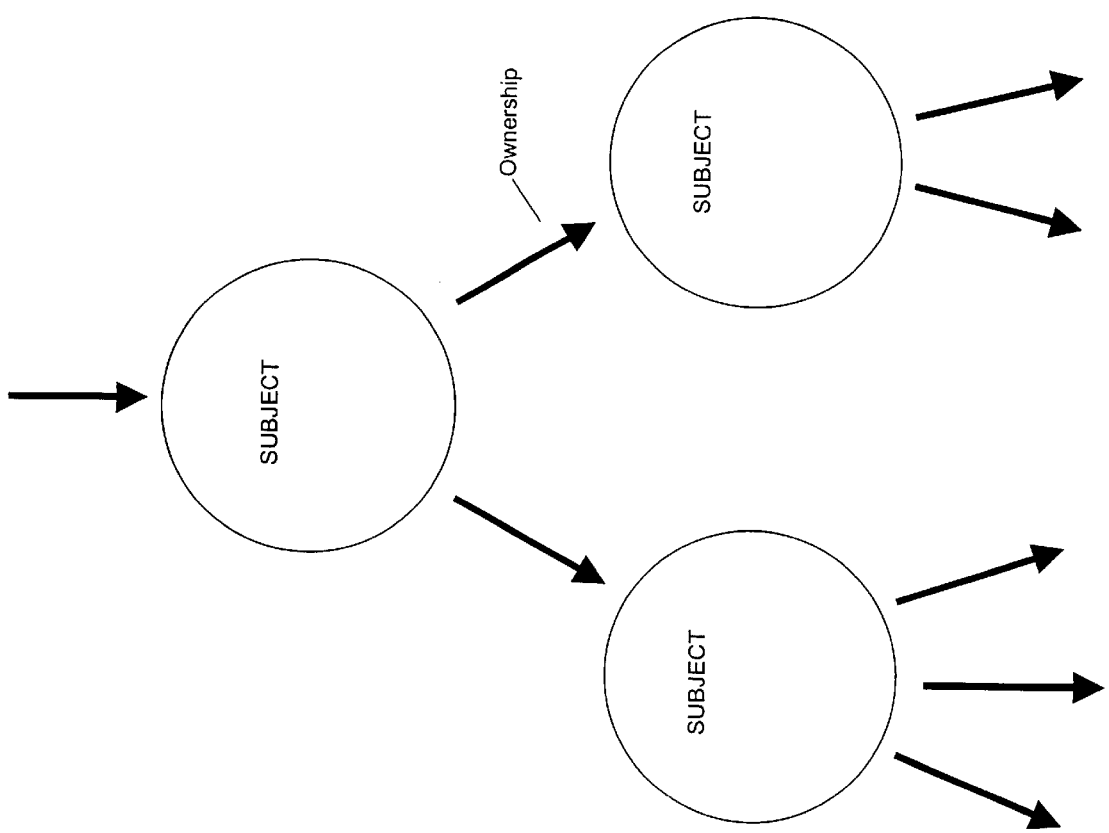
FIG. 2 shows a subject hierarchy.

The structure of information made available through the information mart is based upon a predefined hierarchy of subjects that relate to the enterprise for which information for analysis is to be provided. FIG. 2 shows a portion of a subject hierarchy. The subjects in the subject hierarchy are related through predefined static relationships. Static relationships are also known as "information bearing" relationships. In the case of the present invention, the subjects of the hierarchy are preferably defined so that the information bearing relationships between subjects are intuitive to persons responsible for analysis of the enterprise. For example, if the entity is a manufacturing corporation, a subject for analysis might be a division of the corporation; a further subject for analysis that is intuitively related to the division might be a product produced by that division. Intuitively, "product" is a subject that depends from "division", and so product and division would be related in the hierarchy through a static information bearing definition that follows the intuitive knowledge that product is a subject having a hierarchical relation to division. Moreover, it is intuitive that product is dependent from division. This illustrates the concept of "ownership" as illustrated in FIG. 2. In the subject hierarchy, all subjects (except those at uppermost positions in the hierarchy) are owned by another subject, and all subjects (except those at lowermost positions in the hierarchy) own other subjects. Thus division owns product, and product might own a further subject defined as "parts". Again, these relationships are defined in accordance with common perception of the hierarchy of subjects relating to an enterprise, and so the relationship among subjects is intuitive.

Figure 3:
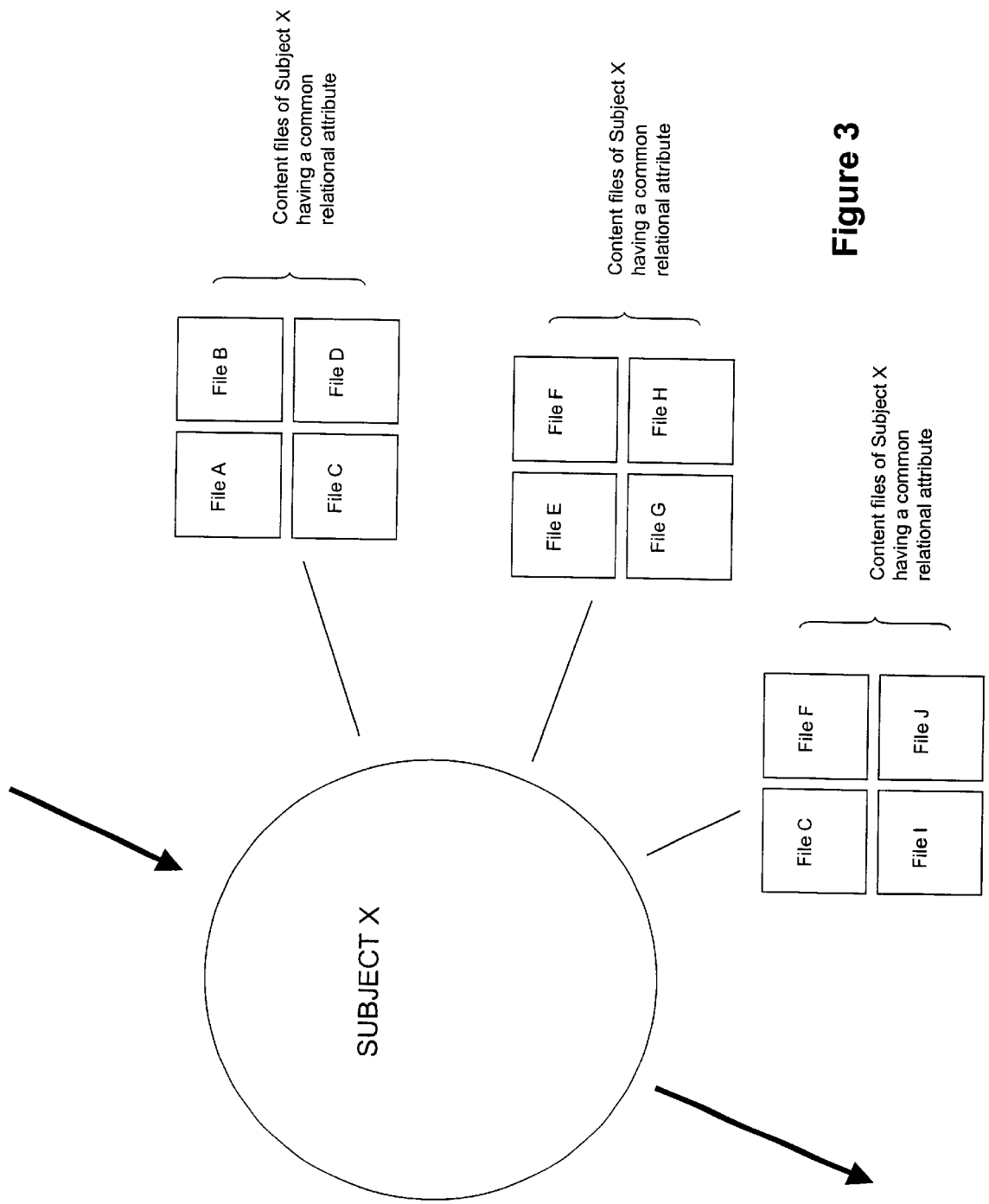
FIG. 3 shows groups of content files that correspond to a subject and have common relational attributes.

The file structure made available through the information mart is further based upon a predefined set of relational attributes. FIG. 3 shows how files associated with a subject are interrelated in accordance with relational attributes. Relational attributes are predefined characteristics, and a file that contains information having one of the predefined characteristics is said to have that relational attribute value. In accordance with the invention, a set of relational attributes is defined in accordance with intuitive needs for different types of information about subjects in the hierarchy. For example, in regard to the subject "product", various types of information about a product may be desired such as financial (costs, sales, etc.), personnel, facilities, etc. Any pieces of information pertaining financial issues would be considered to be related since they provide the same type of information; these pieces of information are thus related through a common relational attribute value. As shown in FIG. 3, a file may have more than one of the predefined relational attribute values (such as File C, which is included in more than one group of files).

Figure 4:
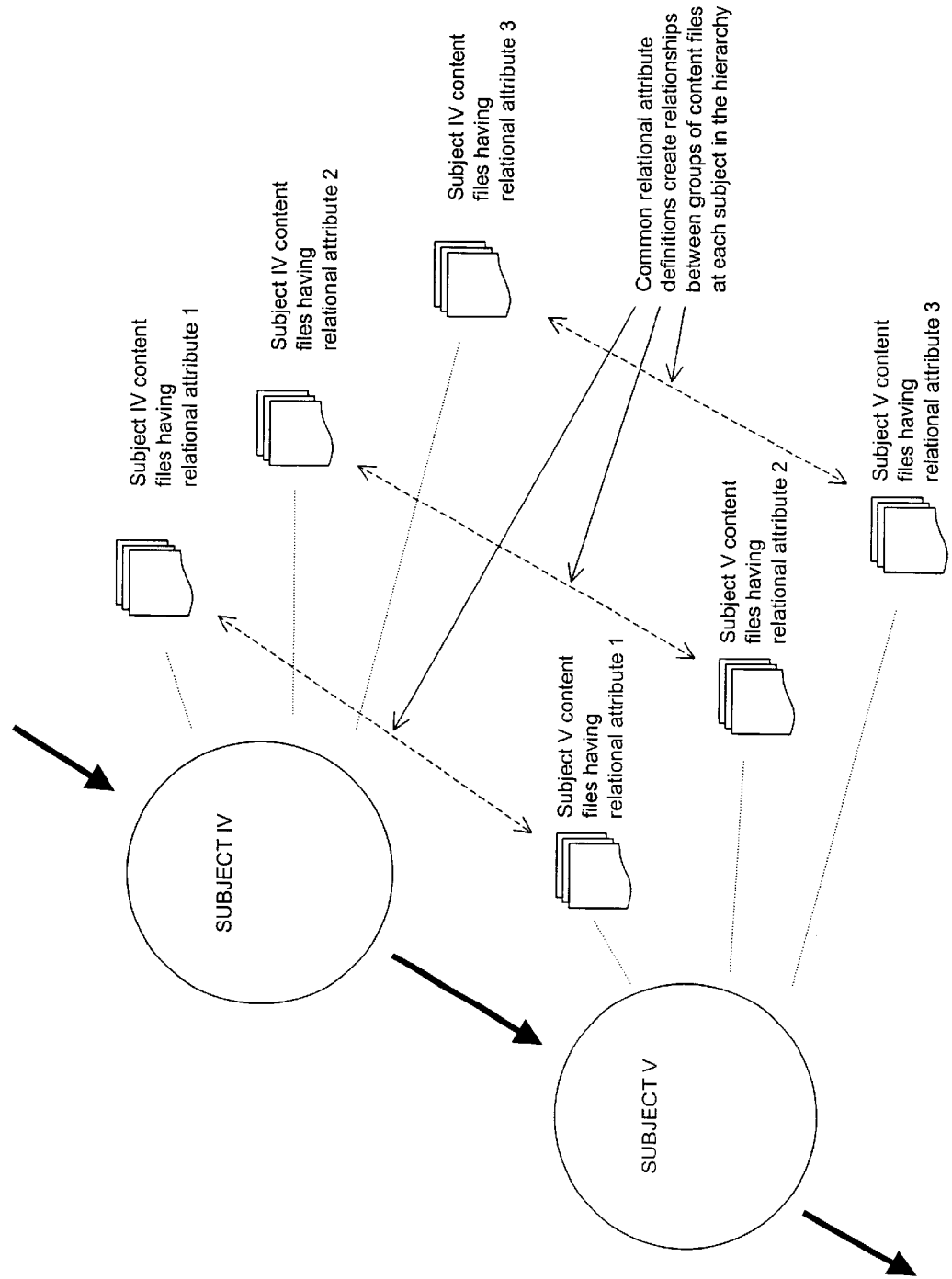
FIG. 4 shows how groups of content files that correspond to different subjects are related through the use of common relational attribute definitions.

In accordance with the invention, the predefined set of relational attributes is applied to all subjects of the predefined subject hierarchy. Accordingly, groups of files relating to the same "types" of information are made available for each subject. Thus, by applying a common set of relational attributes to all subjects of the hierarchy, static information bearing relationships between groups of files pertaining to different subjects are established. FIG. 4 shows how a common set of relational attributes applied to a subject hierarchy creates relationships between groups of files that pertain to different subjects. In the case of the present invention, relational attributes are preferably defined so that the information bearing relationships between groups of files pertaining to different subjects are intuitive. Returning to the example begun above, a type of information that is desired for the subject "product", for example, financial information, would also be intuitively desired for "division" (the owner of product) and "parts" (owned by product). Thus, groups of files providing financial information for each of these subjects are intuitively related because they have been grouped in accordance with a commonly applied relational attribute.

Thus, in accordance with the invention, the information mart organizes content files according to a subject hierarchy and common set of relational attributes that is applied to every subject in the hierarchy. The resulting content file structure if both hierarchical and relational, allowing navigation both between the same types of information pertaining to different subjects, and between different types of information pertaining to the same subject.

Population of the information mart with content files first requires determination of the information that must be made available through the information mart. This leads to definition of a subject hierarchy and definition of a commonly applied set of relational attributes. Subsequently, examination of the data available in the data storage facilities is performed to determine the specific content files that can be created using the available data. This leads to the design of individual content files and the associated processing rules that specify the location and identity of source data and the manner of processing the source data to yield the content file. These tasks yield the logical index that maps content files to source data and processing rules, and to predefined subjects and predefined relational attributes.

Figure 5:
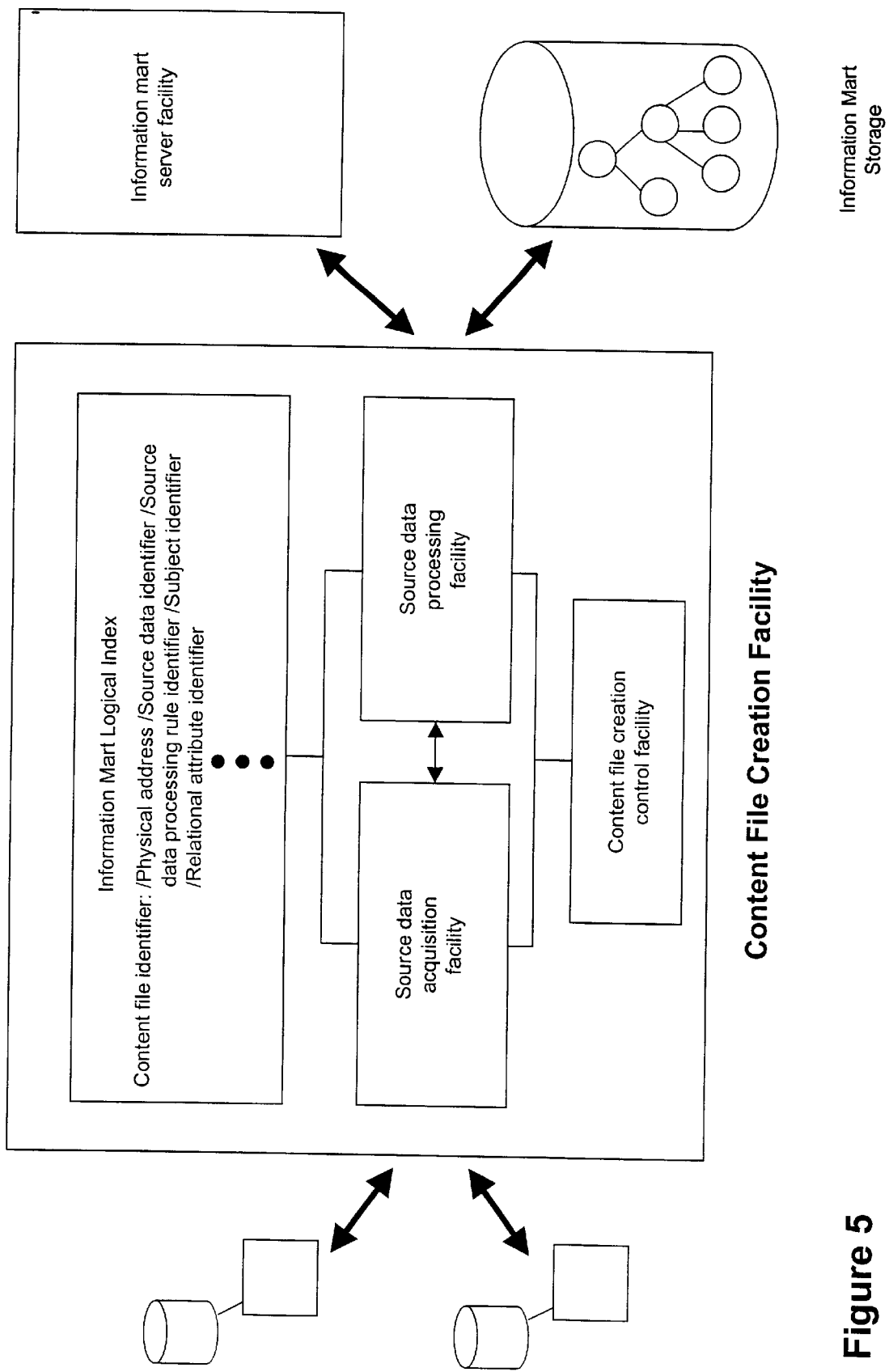
FIG. 5 shows an information mart content file creation facility in accordance with the invention.

FIG. 5 illustrates a generic information mart creation device in accordance with the invention. The information mart logical index is used by the source data acquisition facility and the source data processing system to produce content files under the control of a file creation application. In the simplest example of operation, it may have been determined that a file resident in one of the enterprise's data storage facilities (for example, a scanned version of a hard copy document made available on a web page) inherently conveys information that is desired to be made available through the information mart, and so the information mart can simply provide direct access to the file through communication with the appropriate server. Thus the source file is used as the content file without further processing. Accordingly, the physical address the source file is mapped to the content file identifier in the logical index, a null processing rule (direct access with no processing) is associated with the content file, and no processing is required to create the information mart file. In the more common case, it is desirable to present a file that is created through processing of source data contained in one or more databases. In this case, the logical index maps source data from each source database to the content file identifier, and to a processing rule that defines the extraction of the source data by the source data acquisition facility (for example, extraction of specific elements from specific records of one or more databases) and the processing of the source data by the source data processing system (for example, inserting the extracted elements into a spreadsheet, performing calculations using the element values, generating a graphic illustration of the results of the calculations (e.g. a bar graph), storing the graphic illustration locally and updating the logical index with the physical address of the stored file). Specific sets of processing rules may be physically implemented through standard programming languages and techniques.

Figure 6:
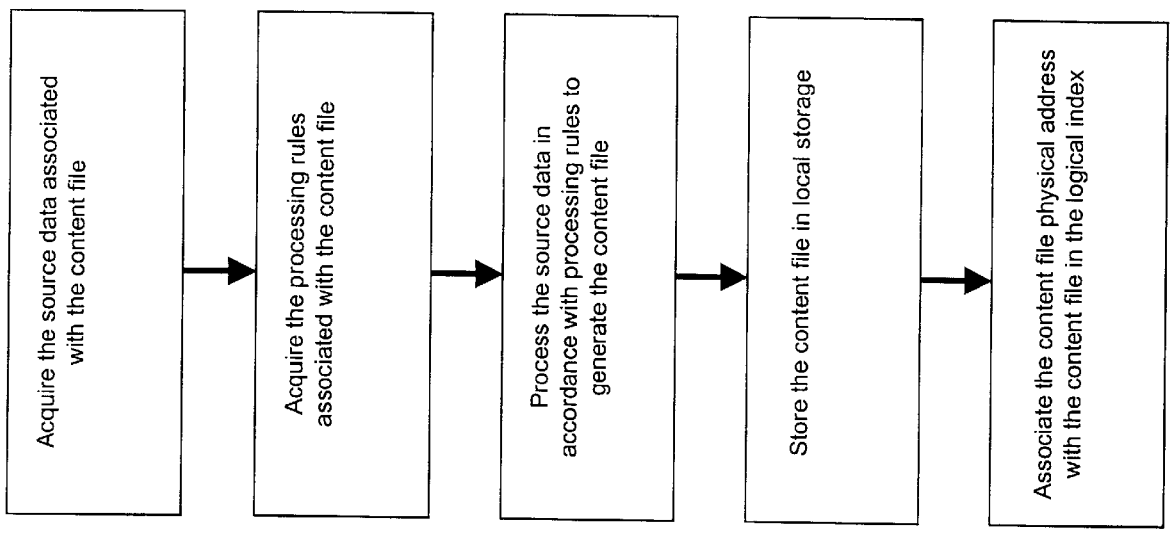
FIG. 6 shows a process for producing an information mart content file in accordance with the invention.

The information mart content file creation process is illustrated in FIG. 6. As shown there, for each content file to be created, source data is acquired in accordance with information contained in the logical index. Processing rules are obtained, and the source data is then processed in accordance with the processing rules indicated in the logical index. The processing result is then stored locally as a content file, and the physical address of the content file is associated with the content file identifier in the logical index. The information mart may therefore be populated by performing this process for every content file identified in the logical index that requires processing.

Periodic updating of content files may be implemented in accordance with the needs of the particular application. Updating may be accomplished through wholesale recreation of the information mart by performing the above file creation process for every information mart file that is generated through processing of source data. Alternatively, selective updating may be provided by comparing the time/date stamp of each content file with the time/date stamp of each file from which its source data originates, and updating any content file for which a source data file has a later time/date stamp.

Implementation of the logical mapping of content files to predefined subjects and relational attributes, and to physical addresses, source data and processing rules, may be achieved in a number of different manners. Source data and processing rules are most easily mapped to content file identifiers through a database. Where a large number of content files is involved, it may also be preferable to store the locally stored content files arbitrarily in a common area of a nonvolatile mass storage device and to relate physical file addresses, predefined subjects and relational attributes to content files through the same database. Alternatively, it may be preferable to simplify accessing and indexing of content files by implementing a file/folder hierarchy modeled on the predefined subject hierarchy and relational attributes. For example, the subject hierarchy may be represented as a folder tree, with a given subject being located in a subfolder within the folder of its owner subject, and containing subfolders for each of its owned subjects. Each subject folder may contain subfolders corresponding to each of the relational attributes. Thus each subfolder would contain content files having the relational attribute value of the subfolder and the subject association of the subject within whose folder the relational attribute folders are located.

Figure 7:
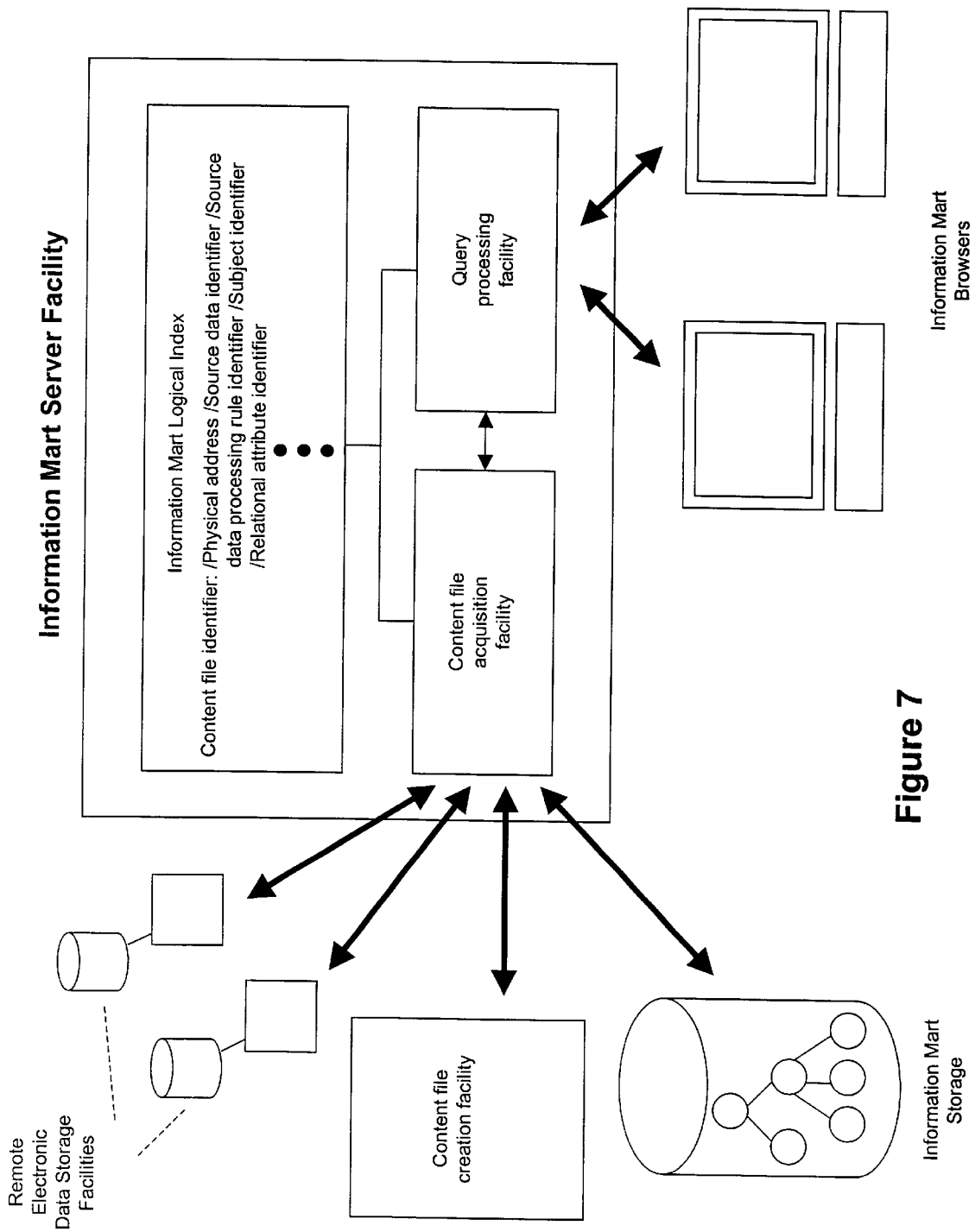
FIG. 7 shows an information mart server facility in accordance with the invention.

FIG. 7 illustrates a generic information mart server facility in accordance with the invention. The logical index is used by a query processing facility for identifying content files that correspond to subject and relational attribute specifications received from information mart browser facilities. A file acquisition facility obtains content files from local information mart storage, or from remote data storage facilities, in accordance with the physical address associated with the content file. The query processing facility provides retrieved content files to the querying information mart browser facility. Both the file acquisition facility and the query processing facility are enabled to communicate through standard communication devices and protocols. The information mart server may be implemented in common with the information mart creation device on a single processing device or may be implemented on a separate processing device.

Figure 8:
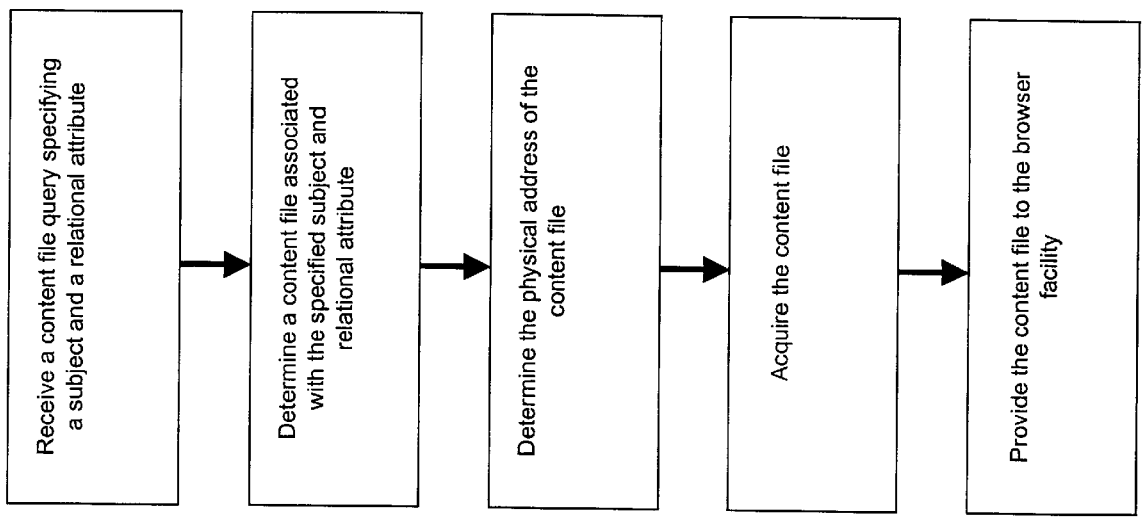
FIG. 8 shows a process in an information mart server facility for providing information mart content files in accordance with the invention.

A process in an information mart server facility for providing content files to an information mart browser facility is illustrated in FIG. 8. As shown there, when a query is received from an information mart browser, the query processing facility determines, through reference to the logical index, a content file that is associated with the predefined subject and the predefined relational attribute specified in the query. Through further reference to the logical index, the physical address of the content file is determined. This physical address is provided to the file acquisition facility, which acquires the file from the appropriate local or remote data storage facility. The acquired file is then provided to the information mart browser by the query processing facility.

Figure 9:
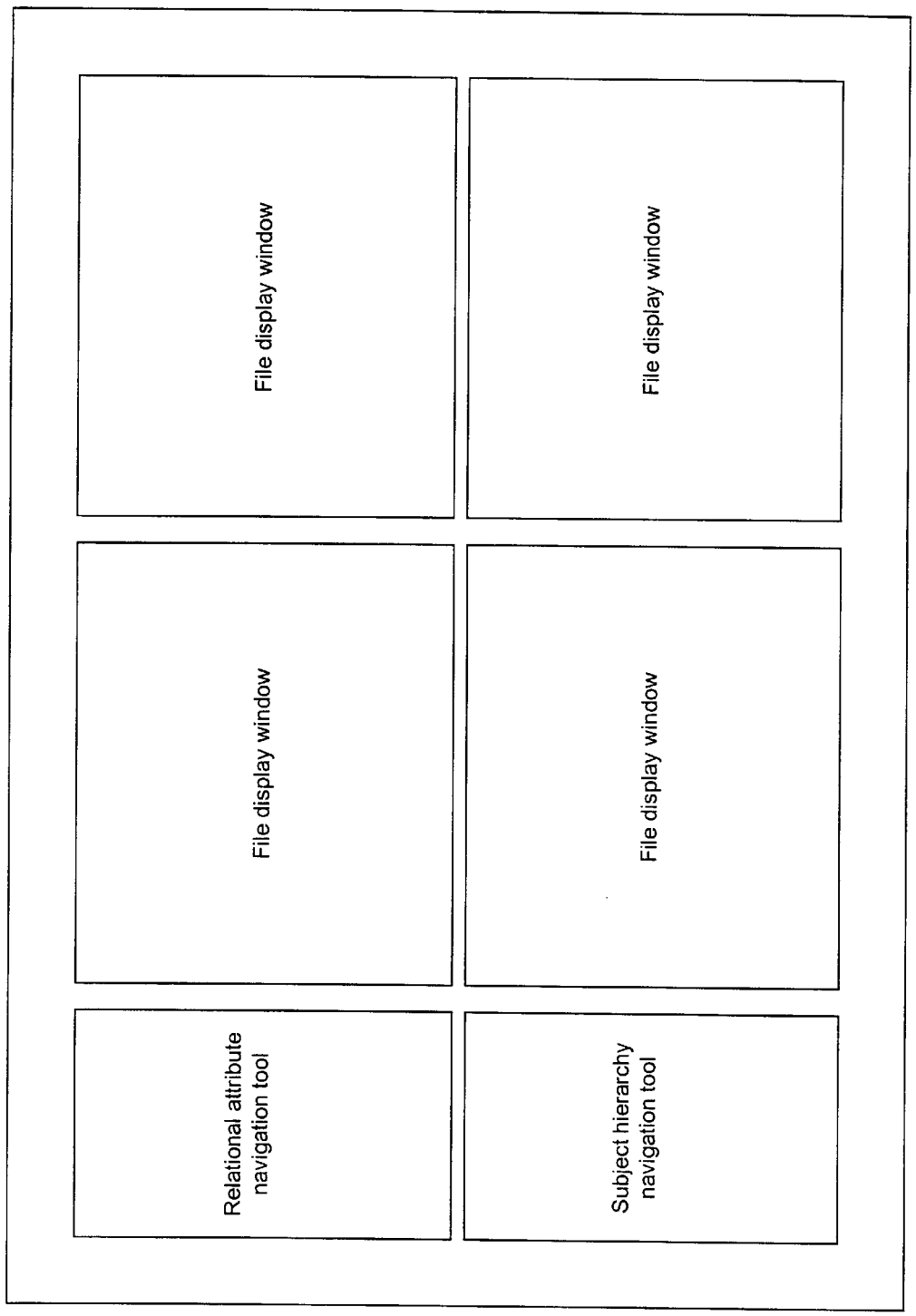
FIG. 9 shows basic functional features of a graphical user interface of a browser facility in accordance with the invention.

FIG. 9 illustrates functional attributes of a graphical user interface for an information mart browser facility in accordance with the invention. As shown in FIG. 9, the user interface provides multiple windows for simultaneous display of content files. Although four windows are illustrated, the invention may be implemented with any number of multiple windows. The user interface further provides a subject hierarchy navigation tool and a relational attribute navigational tool. Manipulation of the navigation tools by the user effectively allows the user to specify the subject and relational attribute of desired information, and provides the basis for queries that the browser facility issues to the server facility to obtain content files for display.

Figure 10:
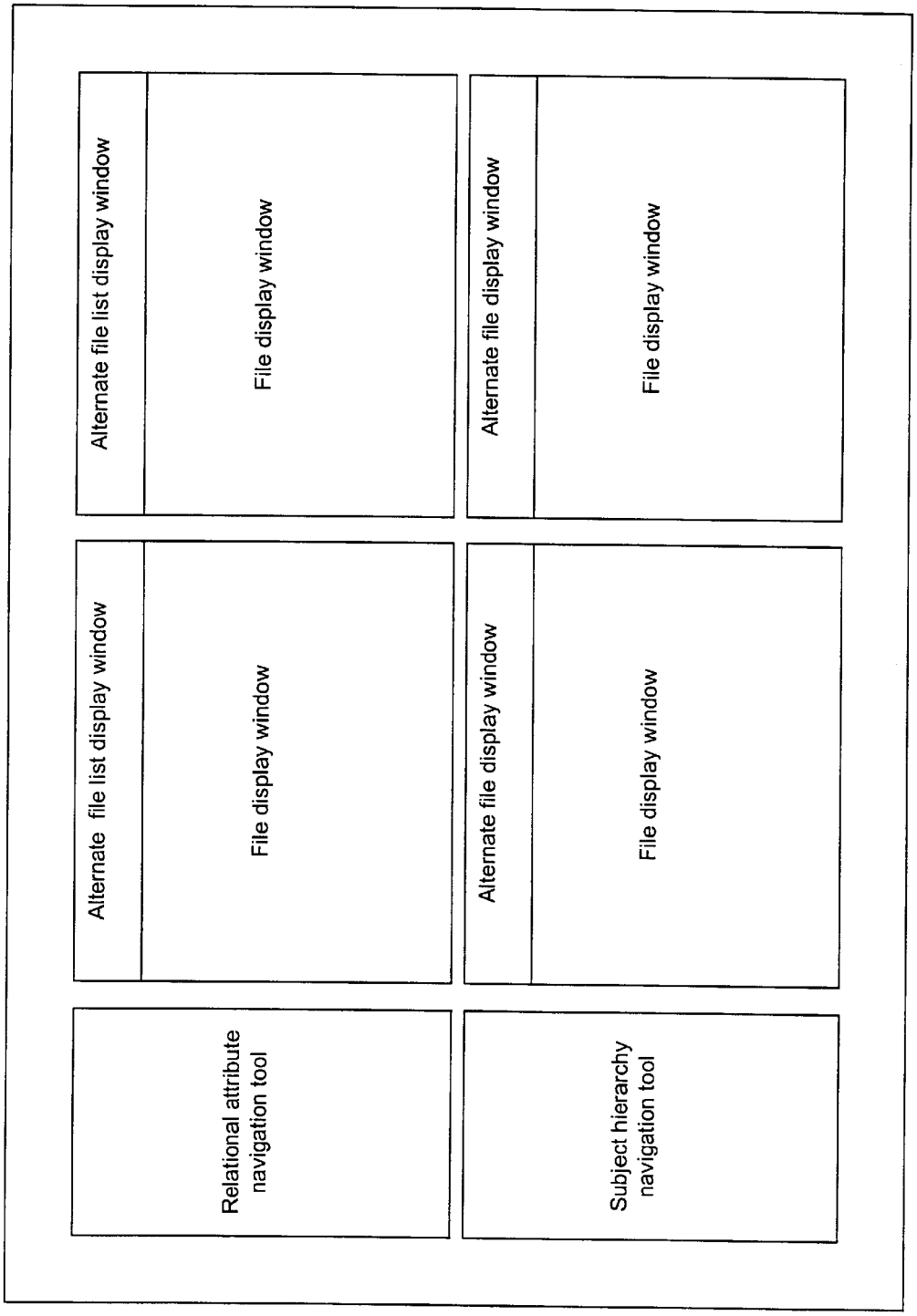
FIG. 10 shows functional features of an enhanced graphical user interface of a browser facility in accordance with the invention.

FIG. 10 shows enhanced functional attributes of a graphical user interface for an information mart browser facility in accordance with the invention. As shown in FIG. 9, each of the multiple display windows is coupled with an alternate file list window. The alternate file list window provides a pull-down list of files that meet the subject and relational attribute specifications provided by the user but that are not displayed. Such files could exist where there are more files meeting the specified criteria than there are windows to display them. In this case, the user is enabled to view names of alternate files and to initiate display of those files. The manner in which specific files are provided by the server for initial display is discussed below.

Figure 11:
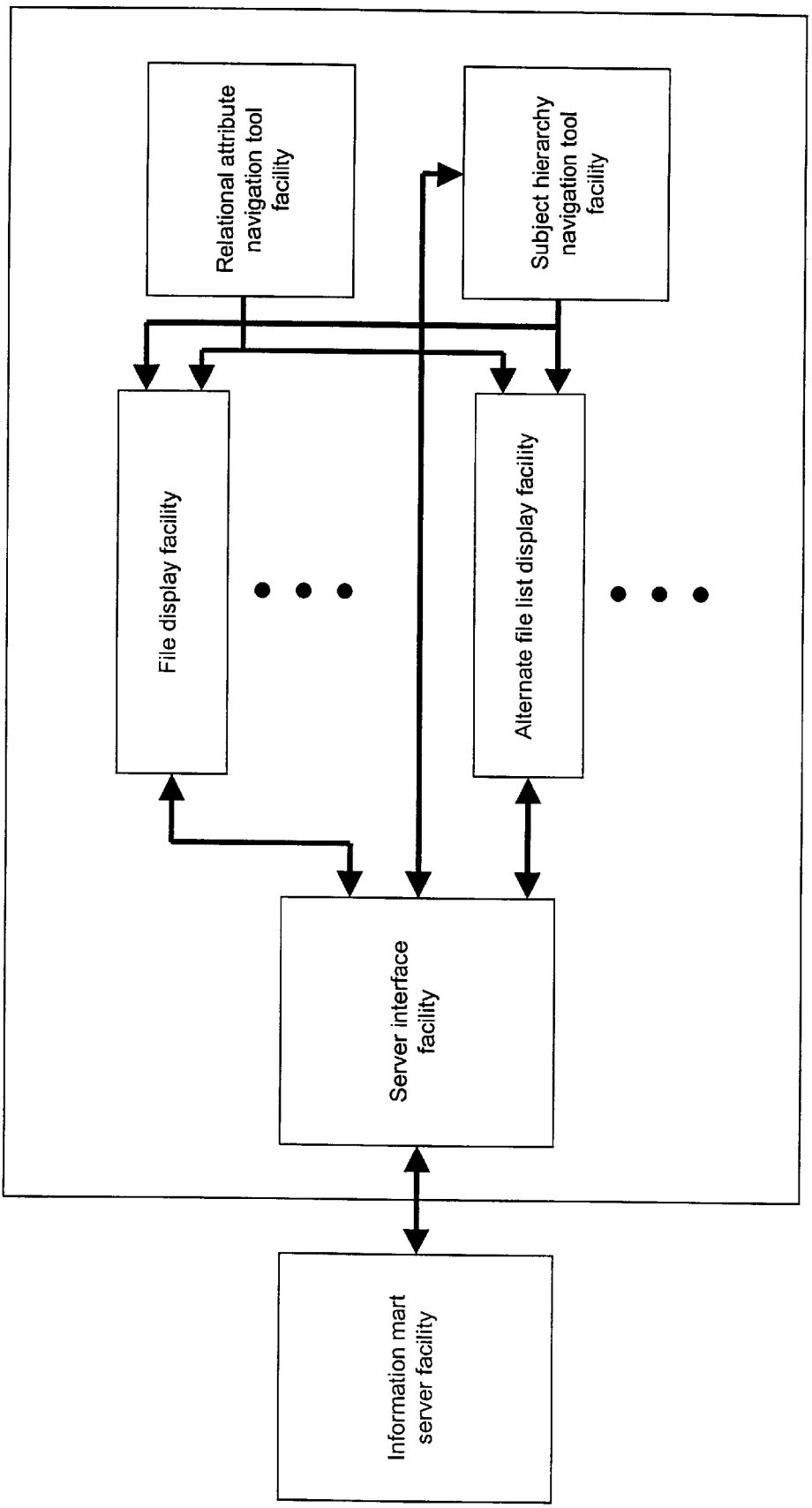
FIG. 11 shows functional features of a generic browser facility in accordance with the invention.

FIG. 11 shows a generic information mart browser facility in accordance with the invention. A relational attribute navigation tool facility and a subject hierarchy navigation tool facility corresponding to the navigational tools illustrated in FIGS. 9 and 10 provide display of the navigation tools and receive user input provided through the navigation tools. Multiple file display window facilities and corresponding multiple alternate file list display window facilities formulate queries based on the input received through the navigation tools and issue queries to the information mart server facility through the server interface facility. The subject hierarchy navigation tool may also issue queries to the information mart server facility through the server interface facility. Files and other data received from the server facility in response to queries are provided to the querying entity through the server interface facility.

Relational attribute navigation is provided by allowing a user to specify which of the predefined relational attributes characterizes desired information. This may be simply accomplished by providing an array of buttons that correspond to the predefined relational attributes, or by providing a list of the relational attributes from which a user may select. Subject hierarchy navigation may be provided in a number of ways. Since the number of subjects in the hierarchy may be too large to display at once, the subject hierarchy navigation tool typically must be capable of providing a changing list of subjects to be chosen from. A hierarchical subject list may be obtained by the subject hierarchy navigation tool facility from the information mart server through a subject hierarchy query. The entire subject hierarchy may be obtained once and maintained in the subject hierarchy navigation tool facility thereafter, or portions of the hierarchy may be dynamically obtained (for example, for subjects owned by a currently selected subject) in response to user subject specifications.

An alternative subject navigation tool is illustrated and described in the provisional application that is incorporated by reference in this application and from which priority is claimed. The alternative subject navigation tool described therein provides a display that represents the hierarchy structure using the file folder metaphor that will be familiar to users of the Microsoft Explorer file management tool. A user navigates through subjects in the hierarchy by opening folders (i.e. accessing a lower level of subjects) and closing folders (i.e. retreating to a higher level of subjects). Selection of a specific folder is received as input specifying the subject associated with the folder.

A file display window facility of the browser facility generates queries based on user input and receives and displays files. Queries include specifications of the predefined relational attribute and predefined subject that are specified by the user through manipulation of the navigational tools. In order to prevent a content file from being provided to more than one querying window, the content file relational attribute associations in the logical index may be augmented with specific display window associations. Accordingly, a query from a display window includes a relational attribute, a subject, and a querying window identifier. In response, the server determines content files associated with the specified relational attribute and subject, and returns the content file that is specifically associated with the querying window. This feature provides the option of structuring the relative positions of displayed files in a manner that is determined to be advantageous to the end user by pre-associating a content file with a window occupying a desired position.

Different options exist for initiating queries. For example, queries may be automatically issued every time that either of the subject specification and relational attribute specification indicated through manipulation of the navigation tools is changed. Alternatively, the user may be required to provide input indicating that the navigation tools indicate the desired specifications. This may be desirable to allow the user to browse through the subject hierarchy to arrive at a subject of interest without necessitating the retrieval and display of content files associated with each subject/relational attribute group traversed by the user during navigation. As a third alternative, the user may be required to provide input indicating that the subject navigational tool indicate a desired subject specification. In this case, the user enjoys the advantages of subject browsing as with the first alternative described above, and is enabled to navigate between relational attribute values for selected subject by simply changing the specified relational attribute.

Each file display window facility of the browser provides the function of displaying information mart content files. Information mart content files may be of any displayable file type, such as JPEG, GIF, HTML, or any of the various web content formats that are compatible with the browser. Accordingly, when a content file is received from the information mart server facility, its type is determined by the file display window facility, for example by examination of the file name extension, and an appropriate application for displaying the content file is launched to display the content file in the window.

Figure 12:
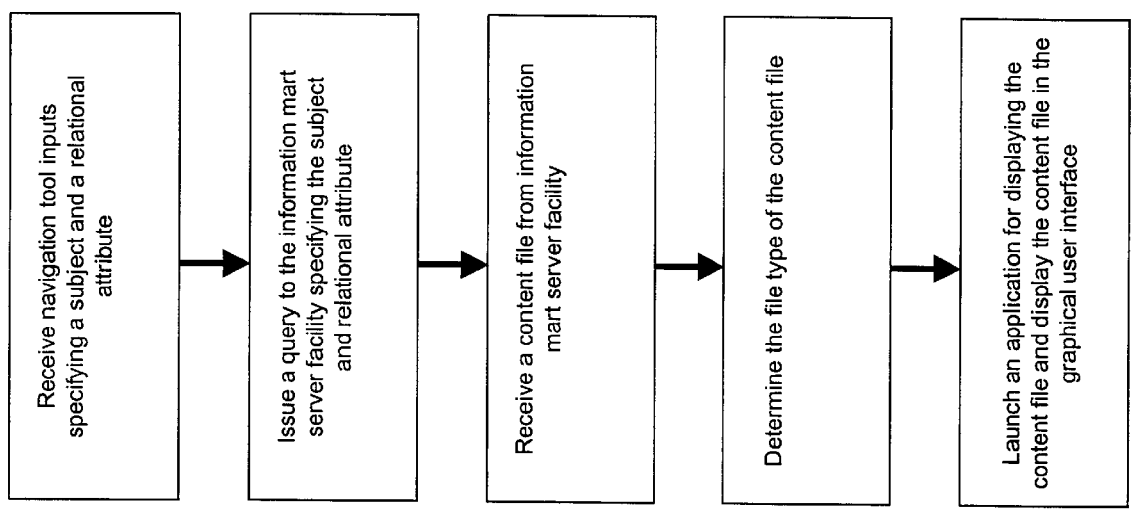
FIG. 12 shows a process performed in a browser facility in accordance with the invention.

The basic process performed in the information mart browser is illustrated in FIG. 12. Input representing a predefined subject and a predefined relational attribute is received through the navigation tools and is provided to multiple file display window facilities. Each file display window facility formulates a query containing the specified subject and relational attribute. The query may further specify an identifier of the window for purposes of retrieving a window-specific content file as described above. The query is issued to the information mart server facility through the server interface. When a content file is subsequently returned and received by the file display window facility, the content file is analyzed to determine the file type, an appropriate application is launched to display the content file, and the content file is displayed in the window.

The alternate file display window facilities likewise issue queries to the information mart file server facility in response to user input. In this case, an alternate file list query requests the server to provide content file identifiers for all files that match the specified subject and relational attribute, and that are not associated with a querying window identifier. In this manner, each alternate file display window will make available a list of content files that are not initially displayed on the browser. The alternate file list display window facility further provides the ability to initiate the issuance of a content file query through its associated file display window facility that specifies the identifier of a content file that is selected by a user from the list. The user is accordingly made aware of all additional information mart content files that are relevant to the specified subject and relational attribute, and is enabled to display those files if desired.

Figure 13:
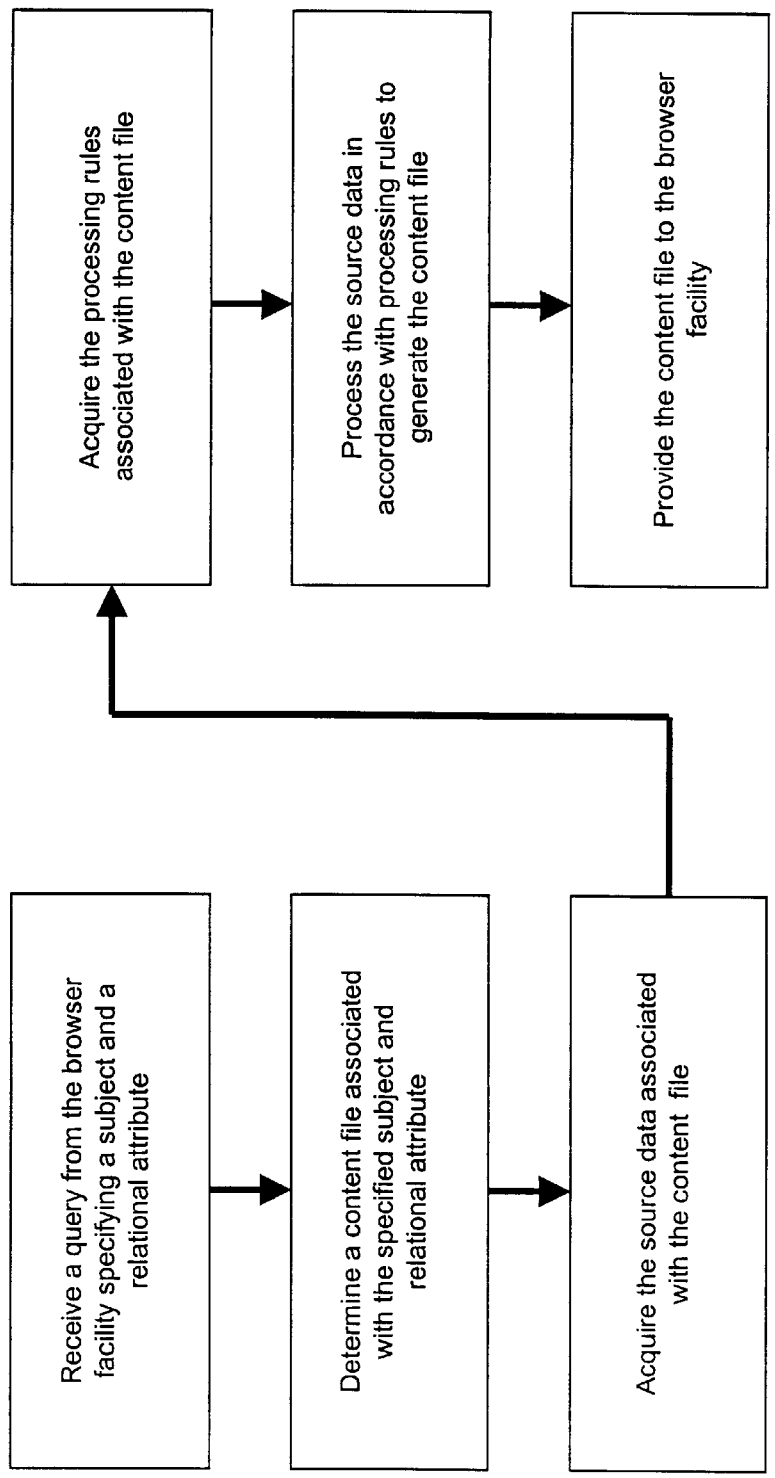
FIG. 13 shows an alternative process in an information mart system for providing information mart content files to a browser facility in accordance with the invention.

The above discussion addresses a system in which the content file creation functions are performed separately from browsing and serving functions. However, it is further envisioned that content file creation may be performed in response to a content file query. As shown in FIG. 7, such a system is implemented by providing communication between the content file acquisition facility of the server and the content file creation facility. Upon receipt of a query, the content file acquisition facility may initiate creation of the file by the content file creation facility. This alternative is advantageous for applications in which some source data is constantly changing. For purposes of selectivity, the logical index may be configured to include information indicating that a particular content file is of a type that is to be created on demand, rather than being created only during a separate updating process. The generic process for creating and serving a content file in accordance with this alternative is illustrated in FIG. 13.

An application of the invention is now described. The application provides gathering, synthesis, and presentation of information derived from data generated in the clinical testing of new pharmaceutical products. It is determined that an enterprise engaged in such testing generally investigates multiple products, each of which may have a variety of potential medical indications for use. Each indication must be tested using a number of different testing protocols, and each protocol must be performed by a number of different investigators. Accordingly, for this application, a hierarchy of subjects that would be intuitive to users can be defined which consist of Drug Substances, Products, Protocols and Investigators. Further, it is determined that the information about these subjects that is needed for the pharmaceutical company to manage the clinical testing can be categorized as financial information (budgets, costs, projections, etc.), project information (regarding the people, facilities, and activities pertaining to the subject), and executive summary information (a combination of financial, project, and other information that gives a consolidated overview of the subject). Accordingly, for this application, a set of relational attributes consisting of financial, project, and executive is defined and applied to each subject of the hierarchy.

Figure 14:
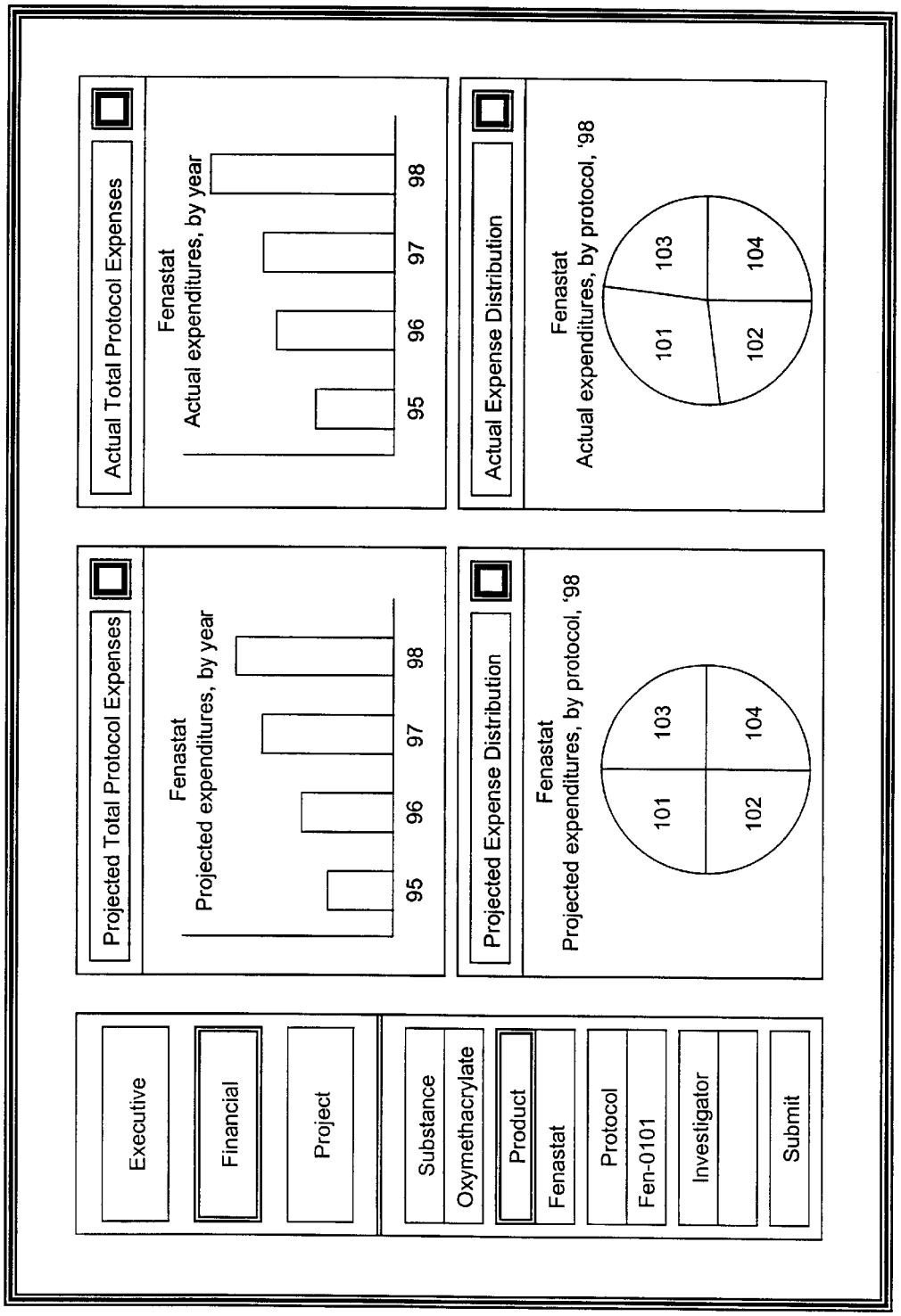
FIG. 14 shows a graphical user interface in accordance an application of the invention in the context of pharmaceutical chemical research.

The browser is operated within the Microsoft Internet Explorer 4.0 browser. As shown in FIG. 14, the user interface consists of five primary frames. Four frames of equal size ("Quadrants") are used to display information mart files. Each of the Quadrant frames includes a thin top frame that provides a list of alternate files, contains the file name for the file displayed in the lower frame, and provides an icon for expand the frame to full-page size and contract to frame size.

A fifth frame along the left-hand side provides the navigation tools. The relational attribute navigation tool consists of three buttons that are labeled with the respective relational attributes "Executive," "Financial" and "Project." Executive view is the default relational attribute. As seen in FIG. 13, the financial button visually indicates that it is the currently selected relational attribute. The subject navigation tool consists of four drop down lists that provide lists of the available predefined subjects at the substance, product, protocol and investigator levels of the hierarchy. When the browser is initialized, the Substance list is populated by default, to provide the user with a list of available top-level subjects. Selection of a subject from a drop down list leads to dynamic population of a dependent list of Products that are owned by the Substance. As seen in FIG. 13, the product list visually indicates that the displayed product subject is the most recently selected subject. A "submit" button is used indicate that the subject selected from among the lists is to be used to retrieve files. In FIG. 13, the displayed product subject "Fenastat" has been submitted as the subject for file retrieval. The displayed files are therefore associated with the subject "Fenastat" and the relational attribute "financial".

From the information illustrated in FIG. 13, the user may navigate directly to executive information about Fenastat by using the executive button on the relational attribute tool, or may directly navigate to project information about Fenastat by using the project button on the relational attribute tool. In either case, the appropriate files are retrieved automatically upon use of the relational attribute navigation tool.

Alternatively, the user may navigate to information regarding other subjects by selecting a "higher" or "lower" hierarchical level, or by selecting another subject at the same hierarchical level of. For example, to navigate to a "lower" (e.g., more detailed) level of information regarding a Protocol that is owned by the Product Fenastat, the user would select a subject from the protocol pick list, and use the submit button to initiate a query specifying the selected protocol. To navigate to information regarding another product subject owned by the oxymethylacrylate subject, the user would pick another product from the current product pick list. To navigate to information regarding another product subject that is not owned by the oxymethacrylate subject, the user would specify the appropriate subject from the substance pick list (essentially moving back up the hierarchy to the appropriate owner), which dynamically reconfigures the product pick list. The user would then pick the desired product from the dynamically reconfigured list and initiate retrieval of the appropriate files.

The server facility and file creation facility are provided on a single computer. The server functions are implemented through Microsoft NT server 4.0, Microsoft IIS 4.0, Microsoft Front Page Extensions, Microsoft Active Server Pages (ASP), and Microsoft Visual Studio. Thus the server is implemented as a web server and can be accessed in accordance with standard web protocols. The server contains a database that implements the logical index for the information mart. This table contain fields for file identifier, last modified date, subject, relational attribute, physical file identifier, NT groups associated with file, file type, and security ID.

The file creation facility is composed of a Scheduling Facility, a Directory Creation Facility and a Content Creation Facility. The scheduling facility manages updating of information mart files. The directory creation facility (DCF) is a Microsoft Excel and Microsoft Visual Basic application that creates a structured file system for storage and organization of information mart files. The file system is designed in accordance with the predefined subject hierarchy. The file structure of the present example includes three directories at the Substance level (Substance 1, Substance 2, and Substance 3). The Substance 1 directory contains six sub-directories—two Product sub-directories (Product 1, and Product 2) and the three content sub-directories (Exe, Fin, Pro). The Product directory Product 1 contains six sub-directories—three Protocol sub-directories (Protocol 1, Protocol 2, and Protocol 3) and the three content sub-directories (Exe, Fin, Pro). The Protocol directory Protocol 1 contains six sub-directories—three Investigator sub-directories (Investigator 1, Investigator 2, and Investigator 3) and the three content sub-directories (Exe, Fin, Pro). The Exe sub-directory under Investigator 1 is open to reveal the four Quadrant sub-directories (Q1 to Q4). It is important to note that the four levels—Substance, Product, Protocol and Investigator provide structure only. Each directory at each level contains the content subdirectories (Exe, Fin, and Pro) and their four Quadrant sub-directories and content files.

The content creation facility (CCF) creates web-format (.htm, .gif, and .jpg) content files using data elements extracted from an Oracle database implemented on a remote server. The CCF facility is composed of Microsoft Excel and Visual Basic programs. Each individual content file is produced in accordance with design rules stored in the Microsoft Excel spreadsheets and Visual Basic programs. Each created file is stored in a folder that corresponds to its intended display quadrant within the browser user interface. That folder is a subfolder of a relational attribute folder, and the relational attribute folder is a subfolder of a subject folder of the hierarchy. Each created file has a unique name that is used for display purposes and a file extension that indicates its file type.

The foregoing description addresses a specific application of the invention in the field of pharmaceutical chemical testing. However, the invention is applicable to any enterprise and is not limited to this specific application.

What is claimed is:

1. A system for managing information in a pharmaceutical product testing enterprise, comprising:

a logical index associating system content file identifiers with predefined source data, with predefined source data processing rules, with subjects of a predefined subject hierarchy that includes a subject corresponding to each substance, product, protocol, and investigator of the pharmaceutical product testing enterprise, and with predefined relational attributes applied to all subjects of the hierarchy and selected from the group consisting of financial, project, and executive relational attributes;

a content file creation facility for generating system content files by obtaining source data associated with a content file identifier from remote electronic storage facilities and processing the source data in accordance with the predefined source data processing rules associated with the content file identifier to generate the content file;

a file server facility for providing content files in response to content file queries from a browser specifying a subject of the predefined subject hierarchy and relational attribute of the set of predefined relational attributes; and a browser comprising:
  a relational attribute navigation tool for receiving user input specifying a relational attribute of the set of predefined relational attributes that characterizes desired information;
  a subject hierarchy navigation tool for receiving user input specifying a subject of the predefined subject hierarchy that characterizes desired information; and
  multiple file display facilities for concurrently issuing content file queries to the server facility comprising a specified relational attribute and a specified subject, and for concurrently displaying content files provide by the server facility in a graphical user interface.

2. The system claimed in claim 1, wherein the content file creation facility comprises a control facility for updating information mart content files.

3. The system claimed in claim 2, wherein updating information mart content files comprises periodically creating each locally stored information mart content file from its associated source data in accordance with its associated source data processing rules.

4. The system claimed in claim 2, wherein updating information mart content files comprises, for each locally stored information mart content file, comparing a time/data stamp of the information mart content file with a time/date stamp of each file containing associated source data, and if the time/date stamp of the information mart content file is older than a time date stamp of a file containing associated source data, generating the information mart content file from its associated source data in accordance with its associated source data processing rules.

5. The system claimed in claim 1, wherein the server facility provides an information mart content file by determining a physical address of the information mart content file associated with the information mart content file in the logical index, and if the information mart content file is a locally stored file, retrieving the file from local storage, and if the information mart content file is a remotely stored file, acquiring the file from a remote electronic storage facility.

6. The system claimed in claim 1, wherein the server provides an information mart content file by specifying an information mart content file identifier to the content file creation facility, receiving a content file from the content file creation facility, and providing the content file.

7. The system claimed in claim 1, further comprising a content file storage facility for storage of information mart content files, the content file storage facility having a folder hierarchy corresponding to the predefined subject hierarchy, each folder of the folder hierarchy containing folders corresponding to each of the predefined relational attributes.

8. The system claimed in claim 1, wherein each association in the logical index of an information mart content file identifier to a relational attribute includes a further association with a file display facility of the browser, and wherein each query issued by a file display facility of the browser includes an identification of the file display facility.

9. The system claimed in claim 1, wherein the file server facility further provides, in response to an alternate content file list query specifying a relational attribute and subject, a list of alternate content files that are associated with a specified relational attribute and specified subject that are not provided by the file server facility in response to a content file query specifying the relational attribute and subject, and wherein the browser further comprises multiple alternate content file list display facilities, each associated with a content file display facility, for concurrently issuing alternate content file list queries to the server in accordance with the specified relational attribute and specified subject, for providing a list of alternate content files associated with the specified relational attribute and specified subject that are not provided by the file server facility in response to a content file query specifying the relational attribute and specified subject, for receiving user input specifying a desired content file from a provided list of alternate content files, and for initiating a query for a content file specified by a user from list of alternate content files.

10. The system claimed in claim 1, wherein the relational attribute navigation tool comprises multiple buttons displayed in the graphical user interface, each button being associated with one of the predefined relational attributes.

11. The system claimed in claim 1, wherein the subject hierarchy navigation tool comprises:
  multiple pull down lists displayed in the graphical user interface, each list being dynamically configured to display predefined subjects owned by a previously selected subject; and
  a button displayed in the graphical user interface for providing input specifying a selected subject displayed in one of said multiple pull down lists as the predefined subject of desired information.

12. The system claimed in claim 1, wherein the subject navigation tool and the relational attribute navigation tool are displayed simultaneously in the user interface.

13. The system claimed in claim 1, wherein the subject navigation tool, the relational attribute navigation tool, and the multiple file display windows corresponding to the multiple file display facilities are displayed simultaneously in the graphical user interface.

14. A computer readable medium storing control programming for controlling a general purpose computer to function as an information mart browser of an information mart system for a pharmaceutical product testing enterprise, the browser comprising:
  a relational attribute navigation tool for receiving user input through a graphical user interface specifying a predefined relational attribute of a set of predefined relational attributes that characterizes desired information, the relational attributes including financial, project, and executive relational attributes;
  a subject hierarchy navigation tool for determining subjects of a predefined subject hierarchy of the information mart system, and for receiving user input through a graphical user interface specifying a subject of the predefined subject hierarchy that characterizes desired information, the subjects of the predefined-subject-hierarchy including a subject corresponding to each substance, product, protocol, and investigator of the pharmaceutical product testing enterprise; and multiple file display facilities for concurrently issuing content file queries to an information mart server facility comprising a specified relational attribute and a specified subject, and for concurrently displaying content files provide by the server facility in a graphical user interface.

15. The computer readable medium claimed in claim 14, wherein the browser further comprises multiple alternate content file list display facilities, each associated with a content file display facility, for concurrently issuing alternate content file list queries to the server in accordance with a specified relational attribute and a specified subject, for providing a list of alternate content files associated with the specified relational attribute and specified subject that are not provided by the file server facility in response to a content file query specifying the relational attribute and specified subject, for receiving user input specifying a desired content file from a provided list of alternate content files, and for initiating a query for a content file specified by a user from list of alternate content files.

16. The computer readable medium claimed in claim 14, wherein the relational attribute navigation tool comprises multiple buttons displayed in the graphical user interface, each button being associated with one of the predefined relational attributes.

17. The computer readable medium claimed in claim 14, wherein the subject hierarchy navigation tool comprises:

multiple pull down lists displayed in the graphical user interface, each list being dynamically configured to display predefined subjects owned by a previously selected subject; and a button displayed in the graphical user interface for providing input specifying a selected subject displayed in one of said multiple pull down lists as the predefined subject of desired information.

18. The computer readable medium claimed in claim 14, wherein the subject navigation tool and the relational attribute navigation tool are displayed simultaneously in the user interface.

19. The computer readable medium claimed in claim 14, wherein the subject navigation tool, the relational attribute navigation tool, and multiple file display windows corresponding to the multiple file display windows are displayed simultaneously in the graphical user interface.

* * * * *